United States Patent
Song et al.

(10) Patent No.: US 12,037,242 B2
(45) Date of Patent: Jul. 16, 2024

(54) HYDROGEN STORAGE SYSTEM AND METHOD FOR MANUFACTURING THE SAME

(71) Applicant: KOREA GAS CORPORATION, Daegu (KR)

(72) Inventors: Taek Yong Song, Incheon (KR); Ji Hye Lee, Incheon (KR); Zhenguo Huang, Chatswood (AU); Guojin Zhang, Riverwood (AU)

(73) Assignee: KOREA GAS CORPORATION, Daegu (KR)

( * ) Notice: Subject to any disclaimer, the term of this patent is extended or adjusted under 35 U.S.C. 154(b) by 888 days.

(21) Appl. No.: 17/020,377

(22) Filed: Sep. 14, 2020

(65) Prior Publication Data

US 2021/0261406 A1 Aug. 26, 2021

Related U.S. Application Data

(63) Continuation of application No. PCT/KR2020/002534, filed on Feb. 21, 2020.

(51) Int. Cl.
*C01B 3/00* (2006.01)
*B01J 21/18* (2006.01)
(Continued)

(52) U.S. Cl.
CPC ............ *C01B 3/0015* (2013.01); *B01J 21/18* (2013.01); *B01J 23/42* (2013.01); *C01B 3/0073* (2013.01);
(Continued)

(58) Field of Classification Search
None
See application file for complete search history.

(56) References Cited

U.S. PATENT DOCUMENTS 8,029,602 B1 * 10/2011 Groshens ................ C01B 3/065
423/658.2
2013/0225863 A1    8/2013 Ramachandran et al.
(Continued)

FOREIGN PATENT DOCUMENTS

JP    2013-531601 A    8/2013
JP    2017-528409 A    9/2017
(Continued)

OTHER PUBLICATIONS

Melih Engin et al., "The first catalytic hydrolysis of ethylenediamine bisborane with hydrogel-supported metallic hanoparticles", International Journal of Hydrogen Energy, vol. 43, No. 32, Jun. 30, 2018, pp. 15083-15094, Elsevier.
(Continued)

*Primary Examiner* — Joseph D Anthony
(74) *Attorney, Agent, or Firm* — Studebaker & Brackett PC

(57) ABSTRACT

Provided is a hydrogen storage system including a solution including ethylenediamine bisborane (EDAB) and ethylenediamine (ED), in which the hydrogen storage system is capable of performing a reversible dehydrogenation/hydrogenation reaction at a temperature of 20° C. to 200° C. in the presence of a heterogeneous metal catalyst including ruthenium (Ru), rhodium (Rh), palladium (Pd), osmium (Os), iridium (Ir), platinum (Pt), nickel (Ni), iron (Fe), cobalt (Co), or a combination thereof.

9 Claims, 8 Drawing Sheets

(51) Int. Cl.
   *B01J 23/42*      (2006.01)
   *H01M 8/04082*    (2016.01)
   *H01M 8/0612*     (2016.01)

(52) U.S. Cl.
   CPC ..... *H01M 8/04216* (2013.01); *H01M 8/0618* (2013.01); *H01M 2250/20* (2013.01)

(56) References Cited

U.S. PATENT DOCUMENTS

| | | | |
|---|---|---|---|
| 2016/0043419 A1* | 2/2016 | Thampan | H01M 8/065 429/423 |
| 2017/0283257 A1 | 10/2017 | Milstein et al. | |
| 2022/0024138 A1* | 1/2022 | Tsunoya | B22F 12/50 |

FOREIGN PATENT DOCUMENTS

| | | | |
|---|---|---|---|
| WO | WO 2012/006347 A2 * | 1/2012 | |
| WO | 2018/107239 A1 | 6/2018 | |
| WO | 2019/053382 A1 | 3/2019 | |

OTHER PUBLICATIONS

Hava Ozay et al., "Ruthenium nanoparticles supported in the network of HES-p(AMPS) IPN hydrogel as efficient catalyst for hydrogen production from the hydrolysis of ethylenediamine bisborane", International Journal of Hydrogen Energy, vol. 45, No. 16, Feb. 16, 2020, pp. 9892-9902, Elsevier.

Sebastian Sahler et al., "Hydrogen storage in amine boranes: Ionic liquid supported thermal dehydrogenation of ethylene diamine bisborane", International Journal of Hydrogen Energy, vol. 38, No. 8, Feb. 4, 2013, pp. 3283-3290, Elsevier.

An Office Action; "Notice of Reasons for Refusal", mailed by the Japanese Patent Office on May 16, 2022, which corresponds to Japanese Patent Application No. 2020-551368 and is related to U.S. Appl. No. 17/020,377; with English language translation.

An Office Action mailed by the Australian Patent Office on May 16, 2022, which corresponds to Australian Patent Application No. 2020233608 and is related to U.S. Appl. No. 17/020,377.

* cited by examiner

HYDROGEN STORAGE SYSTEM AND METHOD FOR MANUFACTURING THE SAME

CROSS-REFERENCE TO RELATED APPLICATIONS

The present application is a continuation of International Patent Application No. PCT/KR2020/002534, filed on Feb. 21, 2020. The disclosure of the above-listed application is hereby incorporated by reference herein in its entirety.

TECHNICAL FIELD

The present invention relates to a hydrogen storage system and a method for manufacturing the same, and more particularly, to a hydrogen storage system capable of reversibly absorbing hydrogen and a method for manufacturing the same.

BACKGROUND ART

While the world's oil reserves are being rapidly depleted, hydrogen on earth can be supplied without limitation. Hydrogen can be produced from coal, natural gas, or other hydrocarbons, or formed by the electrolysis of water, and hydrogen can be produced without using fossil fuels, such as by the electrolysis of water using nuclear or solar energy. Further, hydrogen has the highest energy density per unit weight of any chemical fuel, and water is the main by-product of hydrogen combustion, so that there is essentially no concern about environmental pollution. Currently, it takes several hours to fully charge an electric vehicle, but a hydrogen fuel cell vehicle can be charged in a few minutes, and unlike an electric vehicle, which has a driving range of 100 to 200 km, a hydrogen fuel cell can have a driving range of 500 km, like an existing vehicle.

However, the absence of hydrogen storage and transmission means has been an obstacle to the commercialization of hydrogen fuel cell vehicles. Compressed and liquefied hydrogen storage media in the related art have many limitations. Nevertheless, there is an advantage in that hydrogen stored in a liquefied hydrogen storage medium is highly compatible with existing liquid transfer and fuel injection technologies. In particular, hydrogen is an ideal candidate for storing energy generated by renewable resources, such as wind and solar light, and a liquid-based hydrogen carrier for large-scale energy storage and transfer is a very potential candidate medium. However, the liquid-based hydrogen carrier has the following problems.

Typically, hydrogen is stored in a pressure-resistant vessel under high pressure, or stored as a cryogenic liquid which is cooled to extremely low temperatures, and storing hydrogen as a compressed gas requires a large and heavy vessel. In a steel vessel or tank of common design only about 1% of the total weight is composed of $H_2$ gas when hydrogen is stored in the tank at a typical pressure of 136 atm. In order to obtain equivalent amounts of energy, a vessel of $H_2$ gas weighs about thirty times the weight of a vessel of gasoline/petroleum. In addition, since hydrogen is stored in large vessels, is difficult to transport, and has volatility and flammability, hydrogen causes a serious safety problem when used as a vehicle fuel. Therefore, liquid hydrogen needs to be kept extremely cold at 253° C. or lower, but liquid hydrogen has a high production cost, and much energy is required for the liquefaction process.

A preferred hydrogen storage material needs to be relatively inexpensive while having a high storage capacity compared to the weight of the material, suitable desorption temperature/pressure, excellent kinetics, excellent reversibility, and resistance to poisoning by pollutants present in $H_2$ gas. If the hydrogen storage material does not possess one or more of these properties, it is not suitable for widespread commercial use.

When the hydride is not in the stationary state, the hydrogen storage capacity per unit weight of the material is an important consideration in many application fields. In the case of a vehicle, when the hydrogen storage capacity is low compared to the weight of the material, the driving range of the vehicle is very limited. A low desorption temperature is required to reduce the amount of energy required to release hydrogen and to efficiently use exhaust heat from vehicles, machines, or other similar devices.

Good reversibility is required for a hydrogen storage material to be able to undergo repeated adsorption-desorption cycles without significant loss of hydrogen storage capacity, and in order for hydrogen to be adsorbed/desorbed in a short time, excellent kinetics and resistance to pollutants which may affect the material during the manufacturing and utilization process are also required.

As a hydrogen storage material in the related art, various metal materials for hydrogen storage, such as Mg, Mg—Ni, Mg—Cu, Ti—Fe, Ti—Ni, Mm-Ni and Mm-Co alloy systems have been used. (Here, Mm is Misch, which is a rare earth metal or a combination of rare earth materials/an alloy metal.) However, none of these materials possess all the properties required for commercially widely used storage media. A Mg alloy system was able to store a relatively large amount of hydrogen per unit weight of a storage material, but in order to release hydrogen stored in the alloy due to the low hydrogen dissociation equilibrium pressure at room temperature, high thermal energy needs to be supplied, and $H_2$ gas can be released only at a high temperature of 250° C. or higher.

A Ti—Fe alloy system has an advantage in that the system is relatively inexpensive and has a hydrogen dissociation equilibrium pressure of only several atm at room temperature, but requires a high temperature of about 350° C. and a high pressure of 30 atm or higher for initial hydrogenation, so that the alloy system has a relatively low hydrogen adsorption/desorption rate. In addition, the Ti—Fe alloy system cannot completely release $H_2$ gas due to the problem of hysteresis.

A Ti—Mn alloy system has a high affinity for hydrogen and a low atomic weight, and thus allows a large amount of hydrogen storage per material unit. However, the Ti—Mn alloy system still has the above-described problems as an alloy system.

In the past, two types of hydrogen storage carriers in the form of an organic aqueous solution were studied. Water ($H_2O$)-mediated transfer relies primarily on the hydrolysis of active compounds under catalytically controlled conditions without heating. Such systems are relatively simple compared to thermally driven solid-state reactions, and in the case of hydrolytic hydrogen release, boron-containing compounds such as $NaBH_4$ and $NH_3BH_3$ have been studied most commonly. However, the low solubility of $NaBH_4$ requires a large amount of water, which results in lowering of a hydrogen storage capacity to less than 4.0 wt % and precipitation of a hydrolysis product having a low solubility. Further, a strong basic stabilizer is required to suppress the reaction of $NaBH_4$ with water, but such solutions are highly corrosive, causing engineering problems.

A liquid organic hydrogen carrier (LOHC), which is one of the methods for storing hydrogen, is a technology for storing hydrogen in a liquid organic material and releasing hydrogen through a dehydrogenation reaction.

A lot of studies have been conducted on hydrogen-rich liquid organic hydrocarbons for hydrogen storage applications. However, there are still problems to be solved for liquid organic hydrocarbons in order to satisfy properties such as low melting point, high boiling point, appropriate dehydrogenation kinetics, and low operating temperature.

One of the currently best candidates suitable for hydrogen storage is methylcyclohexane, and a methylcyclohexane compound is dehydrogenated to provide toluene. Theoretically, methylcyclohexane has 6.1 wt % of H and 47.4 kg $H_2/m^3$. However, efficient dehydrogenation requires a high temperature of 350° C. or higher and a high pressure of more than 0.3 MPa, and it is significantly difficult to design an appropriate acidity in order to minimize the formation of cokes with a catalyst having high selectivity for toluene.

As a breakthrough for solving such problems, attempts have been recently made to synthesize a new type of carbon-boron-nitrogen (CBN) compound as a potential liquid hydrogen carrier. In a carbon-boron-nitrogen (CBN) compound, in the dehydrogenation process, instead of a C—H bond of a general liquid organic hydrogen carrier, weaker BH and N—H are cleaved to form $H_2$. This means that milder conditions may be used during the dehydrogenation and rehydrogenation cycles of a liquid organic hydrogen carrier fuel. In addition, such changes in physical properties and molecular structure are made so as to provide advantageous melting points, volatilities and solubilities during removal of the end product of a polymer.

Ethylenediamine bisborane (EDAB) was considered as a medium capable of storing hydrogen as one of the simplest CBN compounds while having a relatively high proportion of B—H and N—H bonds compared to the total molecular weight of the compound, but a temperature of about 120° C. has been typically used in the dehydrogenation reaction of EDAB in the related art, and in this case, several tens of hours were required for complete dehydrogenation.

Therefore, there is a need for developing a hydrogen storage material which is relatively inexpensive and has a high storage capacity, suitable desorption temperature/pressure, excellent kinetics, excellent reversibility, and resistance to poisoning by pollutants present in $H_2$ gas while simultaneously solving the problems of a hydrogen storage material in the related art.

DETAILED DESCRIPTION OF THE INVENTION

Technical Problem

The present invention has been made in an effort to provide a new hydrogen storage system for solving the problems of the above-described liquid organic hydrogen carrier (LOHC).

Technical Solution

The present invention provides a hydrogen storage system which has a low dehydrogenation reaction temperature and a low hydrogenation reaction enthalpy and can be readily dehydrogenated at room temperature by utilizing ethylenediamine bisborane (EDAB) as a liquid organic hydrogen carrier (LOHC).

An exemplary embodiment of the present invention provides a hydrogen storage system including an ethylenediamine bisborane (EDAB) solution, in which the hydrogen storage system is capable of performing a reversible dehydrogenation/hydrogenation reaction at a temperature of 20° C. to 200° C. in the presence of a heterogeneous metal catalyst including ruthenium (Ru), rhodium (Rh), palladium (Pd), osmium (Os), iridium (Ir), platinum (Pt), nickel (Ni), iron (Fe), cobalt (Co), or a combination thereof.

Advantageous Effects

The hydrogen storage system of the present invention has a high storage capacity, suitable desorption temperature/pressure, excellent kinetics, excellent reversibility, and resistance to pollutants present in $H_2$ gas.

The present invention can provide a new hydrogen storage system capable of dehydrogenation at room temperature and in the presence of a metal catalyst.

BEST MODE

Figure 1A:
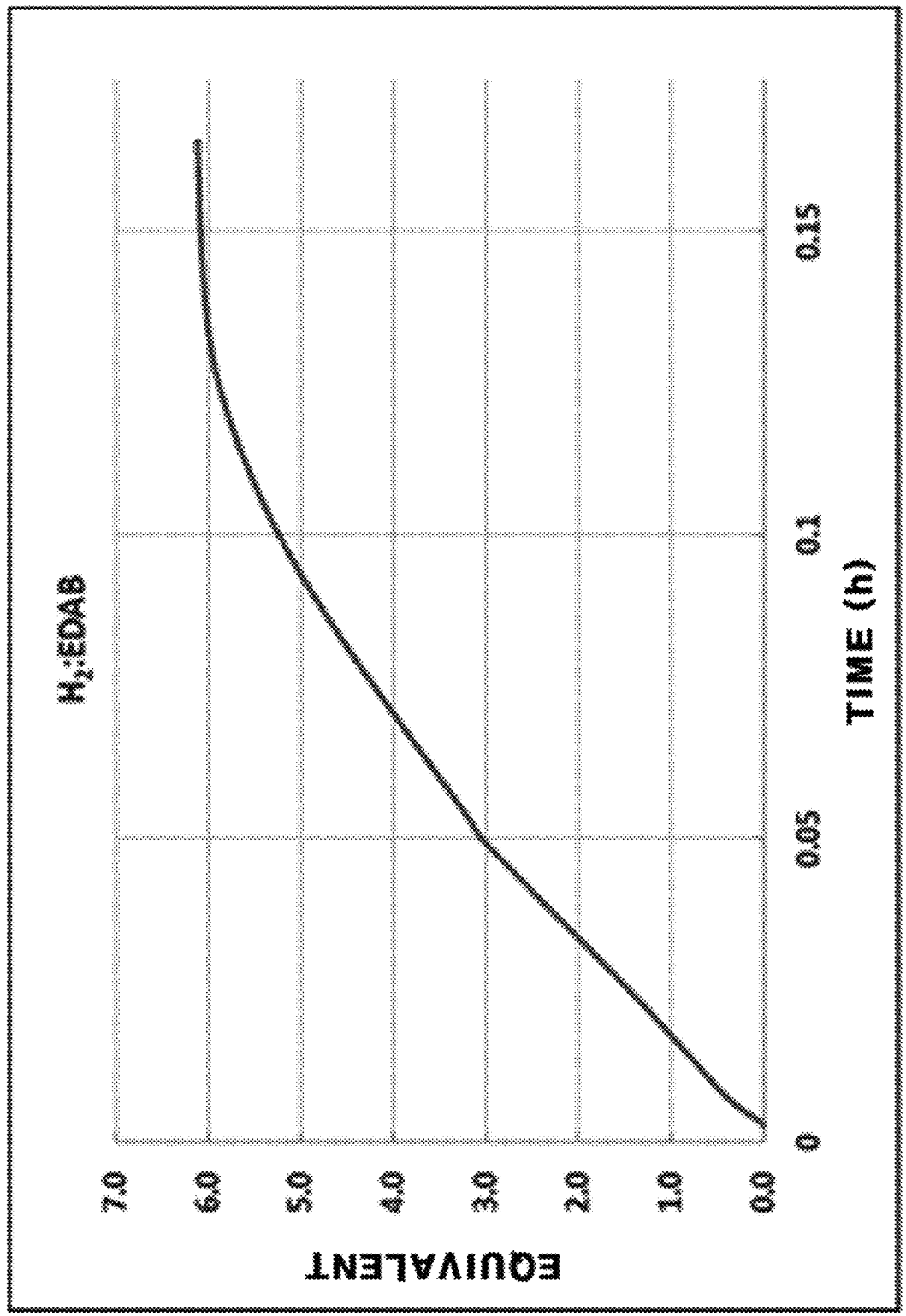
FIG. 1A illustrates the amount of hydrogen generated of an EDAB/ED system under 1 mol % of a Pt/C catalyst.

In the present invention, a hydrogen storage system including a solution including ethylenediamine bisborane (EDAB) and ethylenediamine (EDA) releases a considerable amount of $H_2$ gas by undergoing a dehydrogenation reaction at an excellent reaction rate under room temperature conditions.

Since the hydrogen storage system including EDAB and ED has a low dehydrogenation reaction temperature and a low hydrogenation reaction enthalpy, high temperature and high pressure conditions are not required during the dehydrogenation reaction.

EDAB is suitable for dehydrogenation and hydrogenation reactions by having a high proportion of B—H and N—H bonds in the molecule. EDAB has excellent kinetics such that hydrogen is adsorbed/desorbed in a short time in the presence of a heterogeneous metal catalyst.

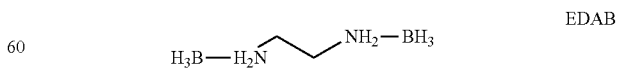

EDAB

An exemplary embodiment of the present invention provides a hydrogen storage system including a solution including ethylenediamine bisborane (EDAB) and ethylenediamine (ED), in which hydrogen storage system is capable of performing a reversible dehydrogenation/hydrogenation reaction at a temperature of 20° C. to 200° C. in the presence of a heterogeneous metal catalyst including ruthenium (Ru), rhodium (Rh), palladium (Pd), osmium (Os), iridium (Ir), platinum (Pt), nickel (Ni), iron (Fe), cobalt (Co), or a combination thereof.

In an exemplary embodiment of the present invention, the hydrogen storage system is capable of performing a reversible dehydrogenation/hydrogenation reaction at room temperature. In an exemplary embodiment of the present invention, the hydrogen storage system is present in the form of a solution at room temperature.

The solution including ethylenediamine bisborane (EDAB) and ethylenediamine (ED) may include dioxane, tetrahydrofuran (THF), benzene (benzene), methyl chloride, n-hexane), dimethyl ether, and a combination thereof as an additional solvent.

In the presence of a heterogeneous metal catalyst, a dehydrogenation reaction occurs between $BH_3$ in EDAB and $NH_2$ in ED, which are present in the hydrogen storage system, and in this case, ED is considered to play an important role in the dehydrogenation reaction of EDAB.

In an exemplary embodiment of the present invention, EDAB and ED in the solution may be mixed at a ratio of 1:1 to 1:10, and as a preferred exemplary embodiment, it is preferred that EDAB and ED are mixed at a ratio of 1:5. As an example, the hydrogen storage system may include a solution of 2 mmol EDAB in 1 mL of 1 mmol ED. If the mixture ratio of EDAB and ED is lower than the above range, EDAB may not be dissolved, and if the mixture ratio is higher than the above range, the reactivity may be reduced.

During the dehydrogenation reaction of the hydrogen storage system of the present invention, the $H_2$ production rate per mol of EDAB is 3 equivalents or more, and preferably 4 equivalents, 5 equivalents, 6 equivalents or more.

The hydrogen storage system of the present invention undergoes a dehydrogenation reaction in the presence of a heterogeneous metal catalyst. As used herein, the 'heterogeneous catalyst' means that the phase of a catalyst is different from that of a material which reacts with the catalyst. A metal of the heterogeneous metal catalyst may be preferably one or more transition metals selected from the group consisting of ruthenium (Ru), rhodium (Rh), palladium (Pd), osmium (Os), iridium (Ir), and platinum (Pt) among platinum metals belonging to Group 8 of the Periodic Table, and preferably includes platinum (Pt). As an exemplary embodiment of the present invention, the heterogeneous catalyst may be a metal/C catalyst based on the above-described metal, that is, a catalyst including a carbon-based support, and may be for example, a charcoal having ions such as Pt, Ru, Rh, and Pd mixed therein. As the most preferred example, the heterogeneous metal catalyst is Pt/C. As the heterogeneous metal catalyst, one or more of the above-described catalysts may be used.

The heterogeneous metal catalyst is provided to improve reversible hydrogen storage properties. The amount of heterogeneous metal catalyst needs to be determined within a limit that the effect of the catalyst is sufficiently exhibited and the hydrogen storage capacity is not significantly reduced by the catalyst, and the content of the heterogeneous metal catalyst in the solution may be 1 to 10 mol %. The heterogeneous metal catalyst is easily recovered for a subsequent catalytic cycle.

Another exemplary embodiment of the present invention provides a method for preparing the hydrogen storage system.

The method for preparing the hydrogen storage system includes: preparing EDAB; preparing a solution by mixing the EDAB and ED; and loading a heterogeneous metal catalyst into the solution.

As an exemplary embodiment, the EDAB may obtained by reacting a borane-complex and an amine compound. In this case, the borane-complex and the amine compound are mixed and reacted, and as an exemplary embodiment, the borane-complex and the amine compound are reacted at a ratio of 1:1 to 1:10, preferably at a ratio of 2:1, during the reaction.

As the borane-complex, a borane pyridine complex, a borane picoline complex, a borane tetrahydrofuran complex, and a borane dimethyl sulfide complex may be included, and as an example of the amine compound, ethylenediamine (ED), and the like may be used.

As a preferred example, borane dimethyl sulfide ($BH_3DMS$) and ED may be reacted at a ratio of 2:1.

A solution is prepared by mixing ED with EDAB prepared from the reaction. In this case, the mixture ratio of EDAB and ED in the solution is 1:1 to 1:10, and preferably 1:5.

After a solution including the EDAB and the ED is prepared, a hydrogen storage system is prepared by loading a heterogeneous metal catalyst in the solution. The solution may further include a solvent such as dioxane, tetrahydrofuran (THF), benzene, methyl chloride, n-hexane, and dimethyl ether.

EXAMPLES

Preparation Example 1: Synthesis of Ethylenediamine Bisborane (EDAB)

EDAB was synthesized by mixing a borane-complex, for example, borane dimethyl sulfide ($BH_3DMS$) and ethylenediamine (ED) at a ratio of 2:1 and reacting the resulting mixture at a standard temperature under a standard pressure for several hours. Dimethyl sulfide was used only as a solvent, and EDAB was obtained as a high-purity white powder by removing the solvent and an excessive amount of $BH_3$-DMS under vacuum.

EDAB synthetic reaction formula

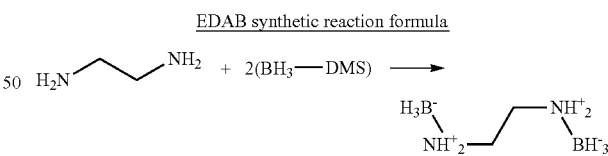

Example 1: Dehydrogenation Reaction of Ethylenediamine Bisborane (EDAB)

The solution obtained by mixing EDAB and ED obtained in the Preparation Example was subjected to a dehydrogenation reaction by the following method in the presence of a heterogeneous metal catalyst (Pt/C).

The solution of 2 mol EDAB dissolved in 1 mL of ED with 1 to 2 mol % Pt/C catalyst loading was completely dehydrogenated at room temperature for 1 hour. As a result, 6 equivalents of $H_2$ gas per mol EDAB were released.

Comparative Example 1

The amount of hydrogen generated over time from the EDAB/ED system was measured by using the same method in Example 1 and using $NiCl_2$ instead of the Pt/C catalyst.

Comparative Example 2

The amount of hydrogen generated over time from the EDAB/ED system was measured by using the same method in Example 1 and using $FeCl_2$ instead of the Pt/C catalyst.

Comparative Example 3

The amount of hydrogen generated over time from the EDAB/ED system was measured by using the same method in Example 1 and using $CoCl_2$ instead of the Pt/C catalyst.

Figure 1B:
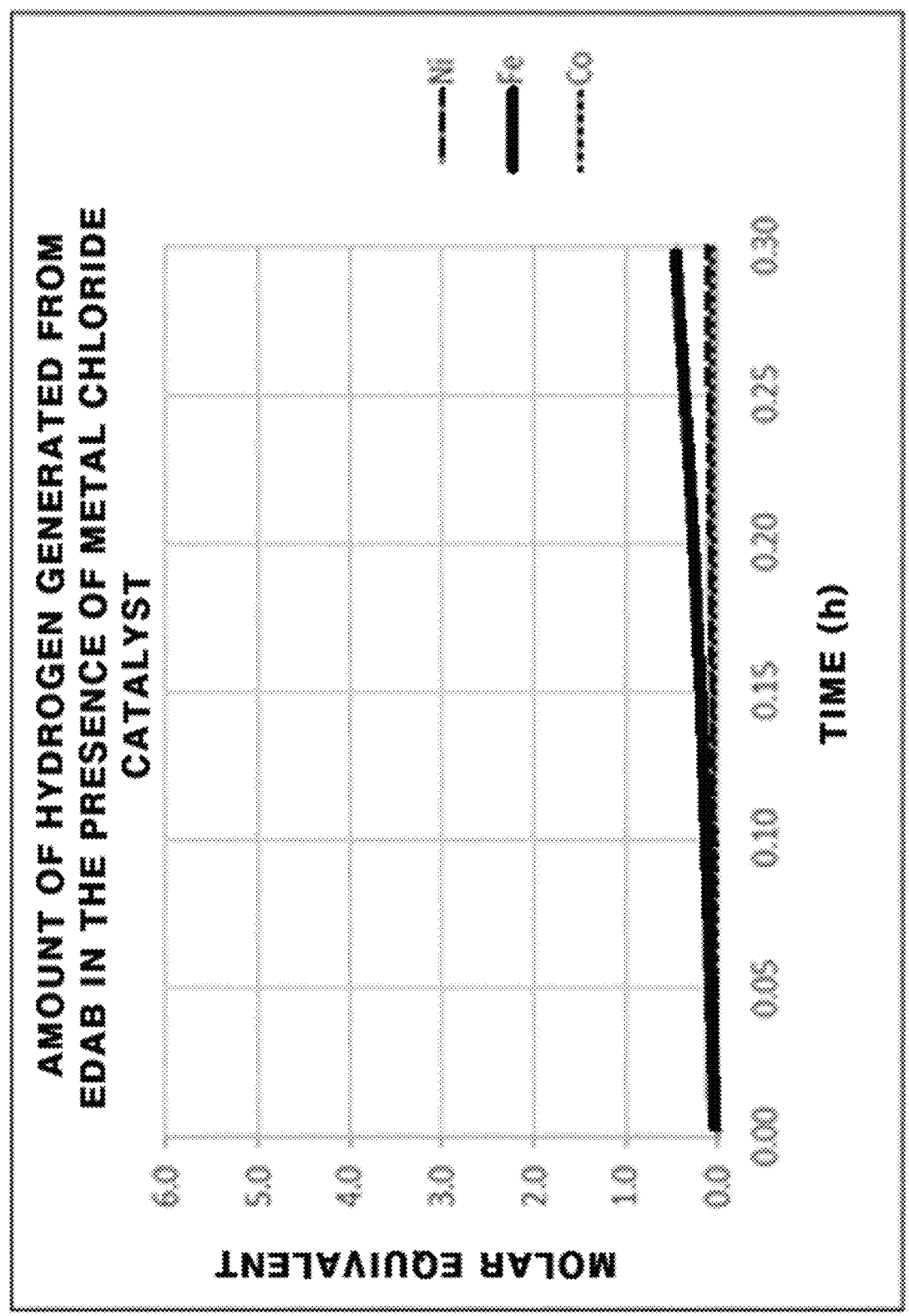
FIG. 1B illustrates the amount of hydrogen generated of a catalyst EDAB/ED system in 1 mol % of $NiCl_2$, $FeCl_2$, and $CoCl_2$, respectively.

FIGS. 1A and 1B express the results of each of Example 1 and Comparative Examples 1 to 3 described above in terms of the molar equivalent of $H_2$ per mol of EDAB. As can be seen from FIGS. 1A and 1B, it was confirmed that in the case of Example 1, the dehydrogenation proceeded in a much shorter time and an excessive amount of hydrogen was generated.

Experimental Example 1: Confirmation of Dehydrogenation Products

Figure 2:
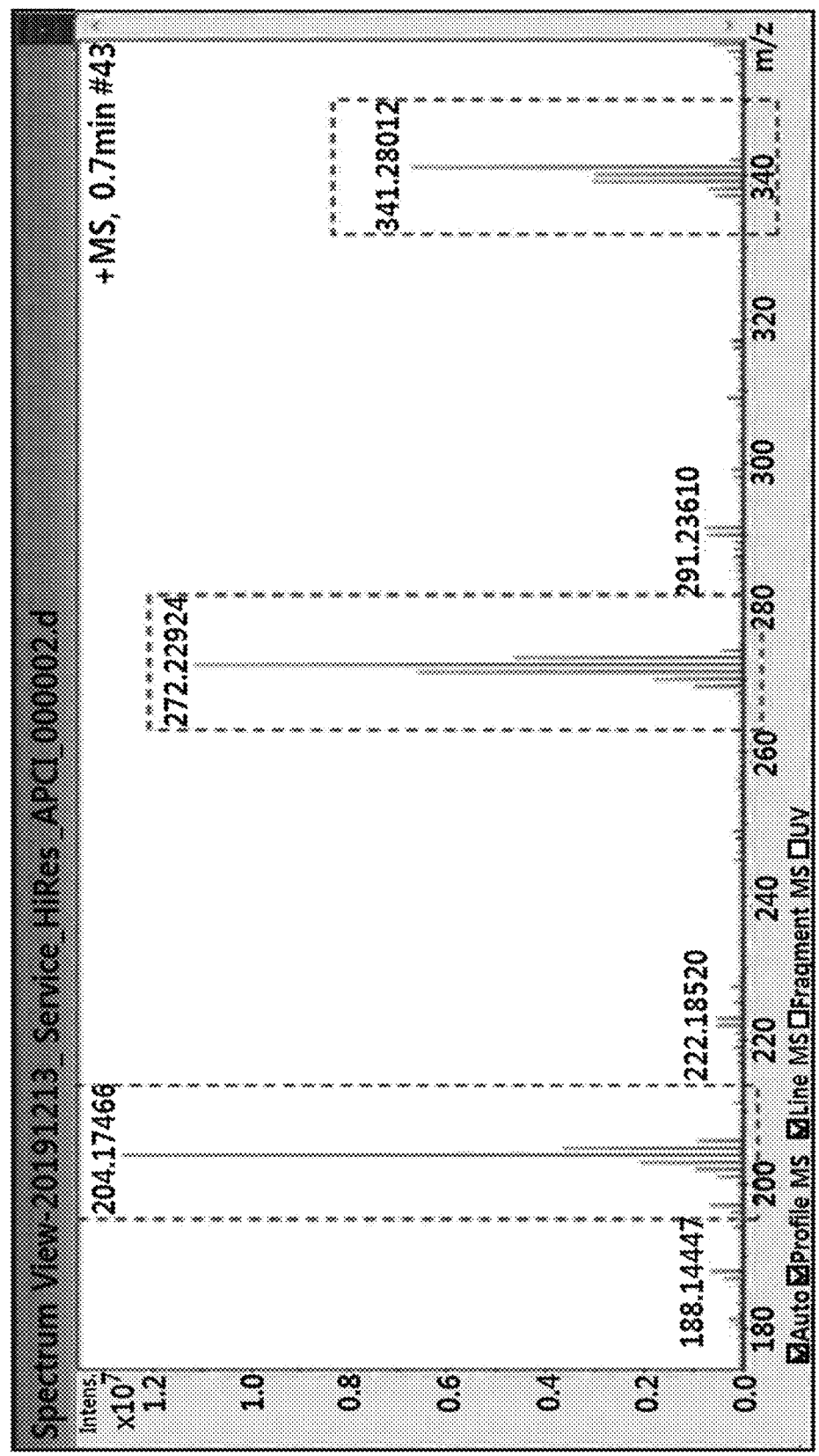
FIG. 2 is an MS analysis result of main compounds produced after a dehydrogenation reaction.

After the reaction of Example 1 was completed, a high resolution MS analysis was performed to confirm dehydrogenation products. As a result, as illustrated in FIG. 2, three main compounds were confirmed. The proposed molecular formulae of these main compounds are illustrated in FIGS. 3A to 3C.

Figure 3A:
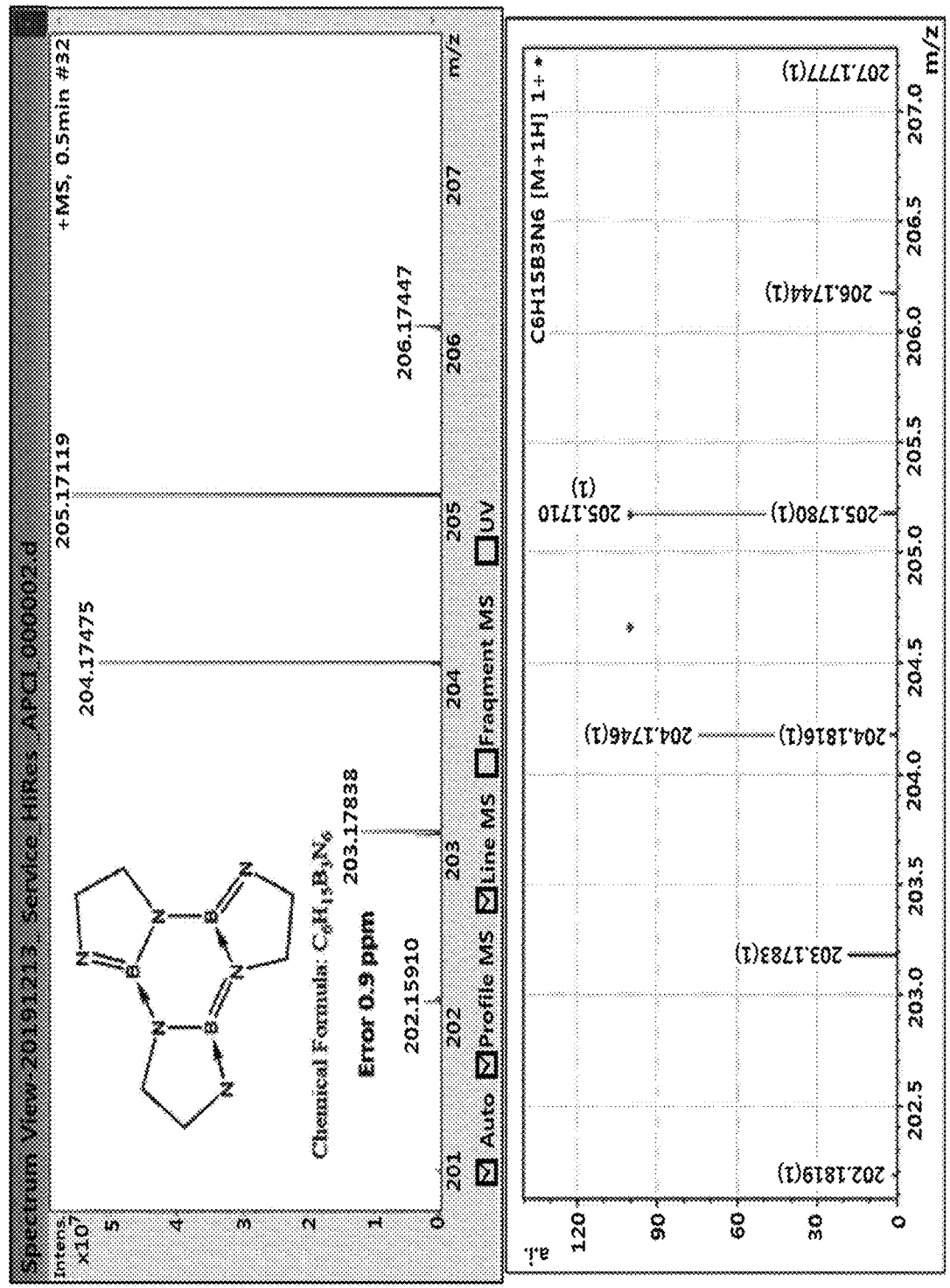
FIGS. 3A to 3C are proposed structures and molecular formulae of main compounds produced after a dehydrogenation reaction.
Figure 3B:
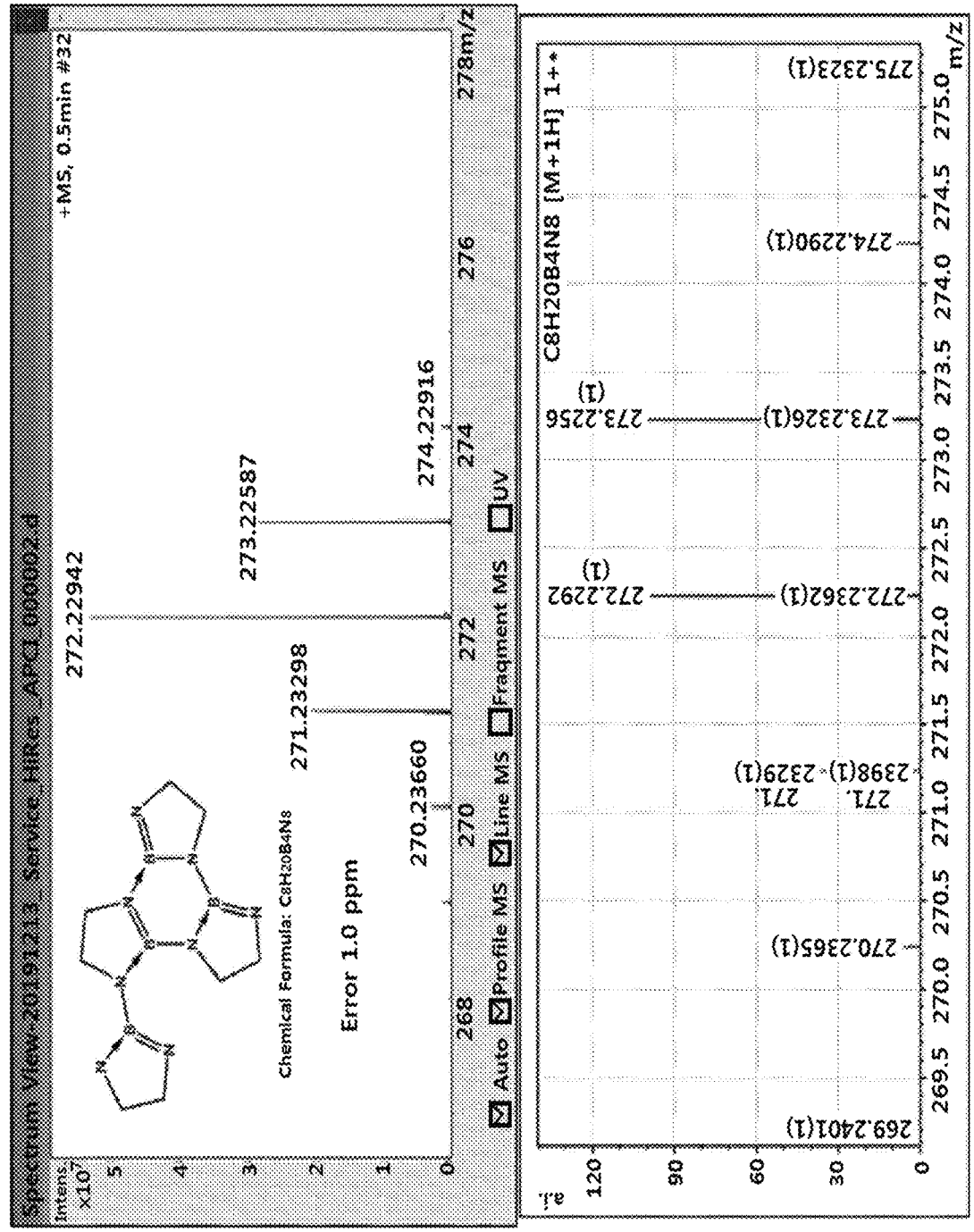
Figure 3C:
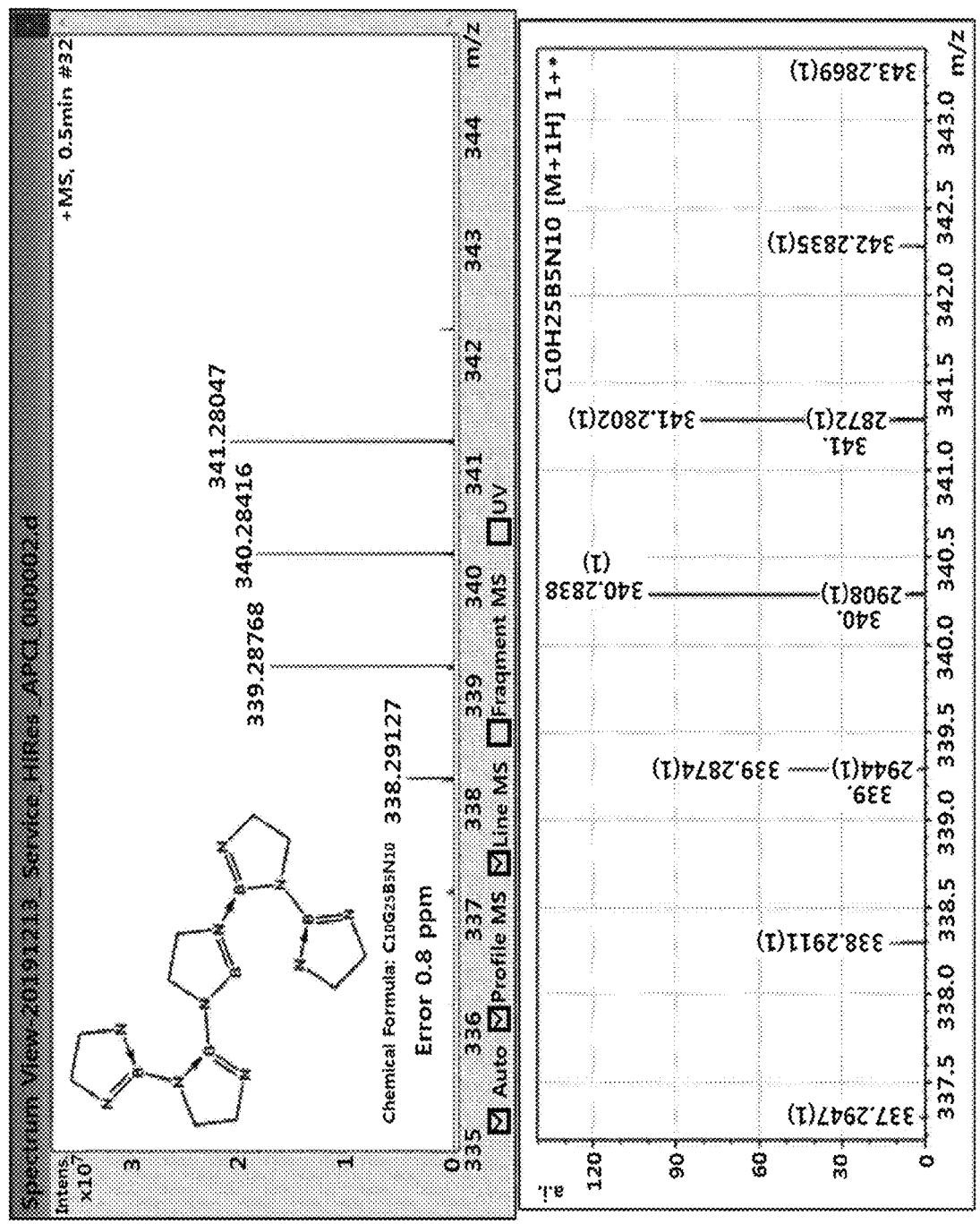

Since the main compounds illustrated in FIGS. 3A to 3C have a 'nitrogen-boron-nitrogen' substructure having a double bond in the molecule, the compounds can be reduced by $NaBH_4$ at room temperature. In FIGS. 3A to 3C, the upper graph illustrates experimental spectra of m/z, and the lower graph illustrates theoretical isotope element patterns of m/z.

Figure 4:
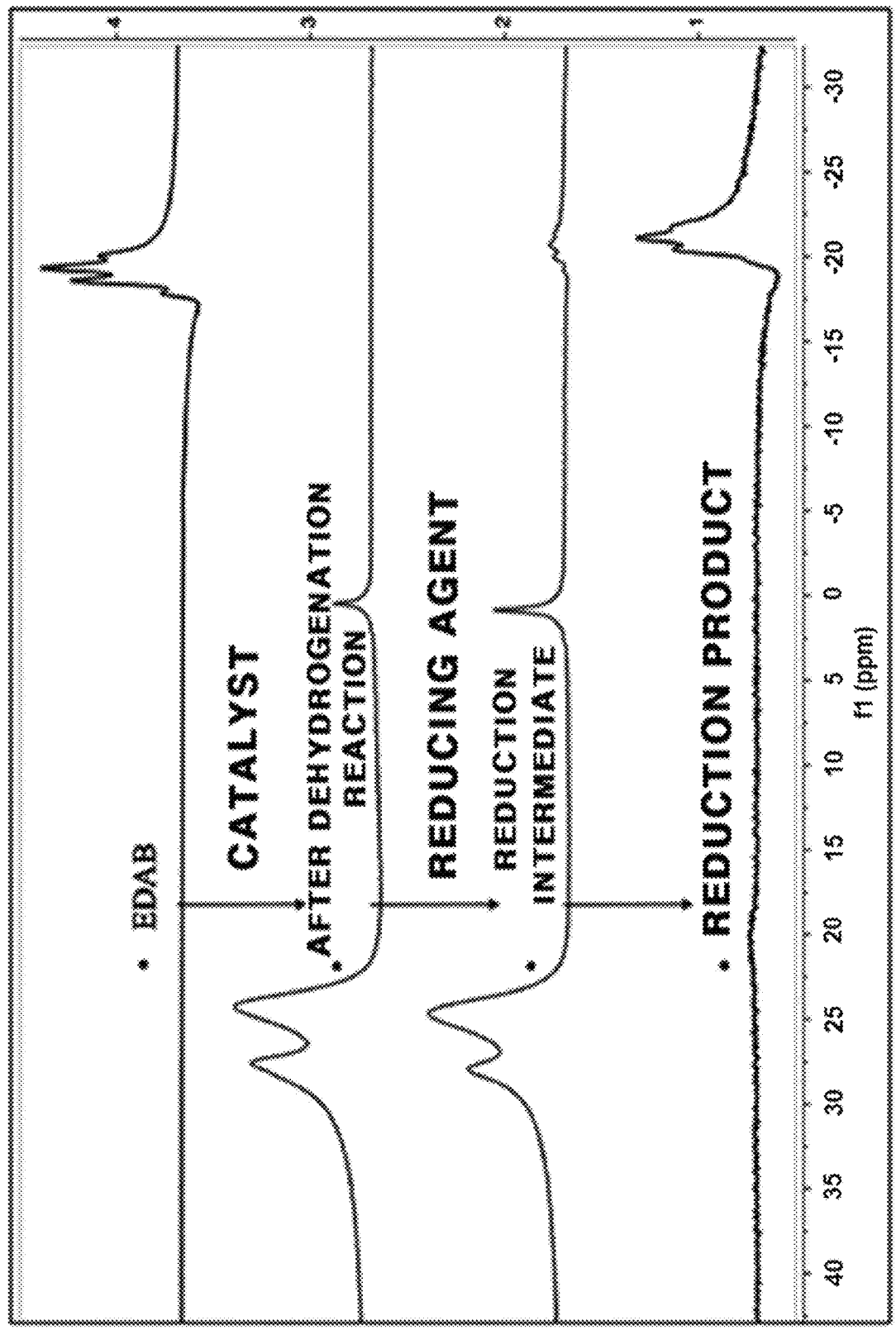
FIG. 4 illustrates $^{11}B$ NMR spectra of EDAB and dehydrogenation and rehydrogenation products thereof.
Figure 5:
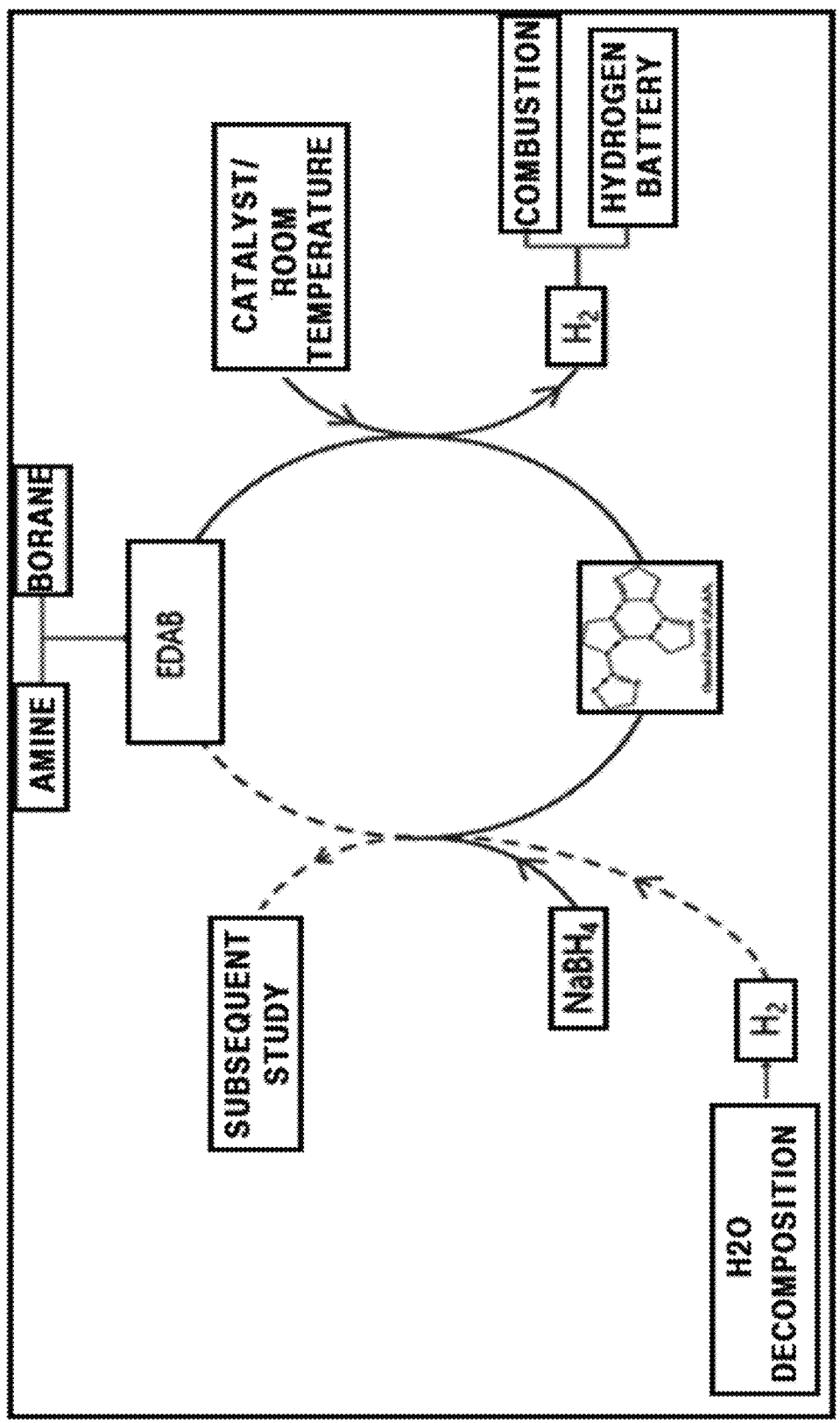
FIG. 5 illustrates a transfer pathway of hydrogen based on the hydrogen storage material system of the present invention.

FIG. 4 illustrates $^{11}B$ NMR spectra of EDAB and dehydrogenation and rehydrogenation products thereof, and FIG. 5 illustrates a transfer pathway of hydrogen based on the hydrogen storage system of the present invention.

According to FIG. 4, a reduced product may be obtained by dehydrogenating EDAB and again reducing the dehydrogenated EDAB in the presence of a heterogeneous metal catalyst. Therefore, the dehydrogenation products illustrated in FIGS. 3A to 3C can be recycled by a reduction reaction by $H_2$ gas (see FIG. 5). In this case, EDAB can be reproduced by reduction by $NaBH_4$ in the presence of a catalytic content of $H_2O$. When a catalytic content of $H_2O$ is absent, the reduction reaction may occur, but the reaction is incomplete, and the dehydrogenation products and the remaining $NaBH_4$ continue to remain even after 24 hours. In contrast, in the $H_2O$ catalyzed reduction, none of dehydrogenation products or $NaBH_4$ remains. The effect of the $H_2O$ catalyst implies the role of $H_2$ produced in situ in the rehydrogenation process, indicating that the process is promoted only by $H_2$ gas.

What is claimed is:

1. A hydrogen storage system comprising a solution comprising ethylenediamine bisborane (EDAB) and ethylenediamine (ED),
    wherein the hydrogen storage system is capable of performing a dehydrogenation/hydrogenation reaction including:
    obtaining hydrogen by a dehydrogenation reaction of the solution at a temperature of 20° C. to 200° C. in the presence of a heterogeneous metal catalyst comprising ruthenium (Ru), rhodium (Rh), palladium (Pd), osmium (Os), iridium (Ir), platinum (Pt), nickel (Ni), iron (Fe), cobalt (Co), or a combination thereof; and
    regenerating EDAB by a regenerating reaction of the product of the dehydrogenation reaction in the presence of a reducing agent and $H_2O$.

2. The hydrogen storage system of claim 1, wherein the hydrogen storage system is capable of performing a reversible dehydrogenation/hydrogenation reaction at room temperature.

3. The hydrogen storage system of claim 1, wherein the heterogeneous metal catalyst comprises Pt.

4. The hydrogen storage system of claim 3, wherein the heterogeneous metal catalyst is Pt/C.

5. The hydrogen storage system of claim 4, wherein a content of the heterogeneous metal catalyst in the solution is 1 to 10 mol %.

6. The hydrogen storage system of claim 1, wherein the solution further comprises a solvent selected from dioxane, tetrahydrofuran (THF), benzene, methyl chloride, n-hexane, dimethyl ether, and a combination thereof.

7. The hydrogen storage system of claim 1, wherein a mixture ratio of EDAB and ED in the solution is 1:1 to 1:10 as a molar ratio.

8. The hydrogen storage system of claim 1, wherein the hydrogen storage system has a $H_2$ production rate of 3 equivalents or more per mol of EDAB through a dehydrogenation reaction.

9. A vehicle comprising the hydrogen storage system of claim 1.

* * * * *